United States Patent [19]

Ichikawa et al.

[11] Patent Number: 4,682,148

[45] Date of Patent: Jul. 21, 1987

[54] DISPLAY PAGER HAVING MEMORY OVERFLOW INDICATION AND CONCURRENT MESSAGE DISPLAY FUNCTIONS

[75] Inventors: Yoshio Ichikawa; Kazumori Yamada, both of Tokyo, Japan

[73] Assignee: NEC Corporation, Tokyo, Japan

[21] Appl. No.: 530,311

[22] Filed: Sep. 8, 1983

[30] Foreign Application Priority Data

Nov. 27, 1982 [JP] Japan ................................ 57-206862

[51] Int. Cl.[4] ........................ H04Q 9/00; H04M 11/02; G06F 3/14

[52] U.S. Cl. .................................. 340/311.1; 340/321; 340/825.44; 340/799

[58] Field of Search ................ 340/311.1, 321, 825.44, 340/799, 539, 789, 534; 455/18

[56] References Cited

U.S. PATENT DOCUMENTS

| | | | |
|---|---|---|---|
| 4,028,661 | 6/1977 | Mortimer | 340/311.1 |
| 4,356,519 | 10/1982 | Cogdell | 340/825.44 |
| 4,385,295 | 5/1983 | Willard et al. | 340/311.1 |

*Primary Examiner*—James L. Rowland
*Assistant Examiner*—T. Rittmaster
*Attorney, Agent, or Firm*—Sughrue, Mion, Zinn, Macpeak & Seas

[57] ABSTRACT

A radio paging receiver for receiving a carrier wave modulated paging signal which includes a preamble, an address code and a message, is composed of at least a receiver section, a waveform shaping circuit, a memory section, a control section, a speaker with driving sectionto sound an alert signal and a display section. The memory section stores a predetermined number of received messages, which are counted as they are received by a counter in the control section. The display section under the control of the control section, produces a three part display, the first part being an indication of the age of the displayed message relative to the other messages stored in memory, the second part the call type, when a dual call service is implemented, and the last part one of the messages stored in memory. If a message is being displayed as a new message is received, the previous message continues to be displayed, while the new message is stored in memory if memory space is available. In addition, the receiver operates to change the first part of the display to inform the subscriber that a new message has been received.

12 Claims, 15 Drawing Figures

DISPLAY PAGER HAVING MEMORY OVERFLOW INDICATION AND CONCURRENT MESSAGE DISPLAY FUNCTIONS

BACKGROUND OF THE INVENTION

The present invention relates to a radio paging receiver having a display function and, more particularly, to the improvement of the display function.

A radio paging receiver receives not only subscriber or address codes but also messages, stores the messages received and displays them on its display unit by read-out operation. Examples of this kind of receiver include the paging receiver disclosed in the UK Patent Application No. 2,061,582 by M. Masaki, assigned to the present applicant. In this receiver, upon receipt of a new message during the display of an earlier received message, the displayed message is replaced by the new one. Therefore the earlier message may be lost before the subscriber can record or dial this earlier message.

Also known is a receiver which memorizes a plurality of messages and subsequently confirms the content to be read-out in response to the depression of a push-switch or switches. If messages are received by such a receiver beyond the capacity of its message storage means, some of the messages may be erased before the bearer of the receiver confirms all the received messages.

There further are receivers, like the one disclosed in the U.S. Pat. No. 4,249,165 issued on Feb. 3, 1981, which has a memory mode but does not have an alert tone, to alert the subscriber that a paging signal is being received and the paging message is being stored. In its memory mode, this kind of receiver cannot inform the subscriber whether or not a paging signal is being received.

SUMMARY OF THE INVENTION

Therefore, an object of the present invention is to provide a paging receiver with display function, which continues to display any received and displayed message until the bearer thereof confirms the message and, if a new message is received during the display of the earlier message, concurrently displays this earlier message and the fact of the new message having been received.

Another object of the invention is to provide a paging receiver with display function, which, if the receipt of a new message during the display of an earlier received message results in the overflow of the message memory means thereof, concurrently displays the earlier received message and the fact of overflow.

Still another object of the invention is to provide a paging receiver with display function having such a memory mode that, if a paging signal is received under said memory mode, the receiver memorizes the message and displays the fact that the paging signal has been received; if a plurality of paging signals are received, displays the number of the paging signals received and, if the memory means thereof overflows, displays the fact of overflow.

According to the invention, there is provided a radio paging receiver for receiving a carrier wave modulated with a paging signal comprising a preamble code, an address code and a message, said receiver comprising: memory means for storing a prescribed number of received message codes; display means having a plurality of display digits; counter means for counting the number of messages stored in said memory means; and control section means for displaying the received message on said display means, reading in response to a switching signal a message out of said memory means and displaying it on said display means, displaying the contents of said counter means on said display means, counting down the contents of said counter means every time a message is provided and, if said receiver receives and stores a new message during the display of the earlier received message on said display means, keeping the display of said earlier received message as it is while displaying the fact of the new message having been received and stored.

BRIEF DESCRIPTION OF THE DRAWINGS

Other objects, features and advantages will become more apparent from the detailed description hereunder taken in conjunction with the accompanying drawings, wherein.

DESCRIPTION OF THE PREFERRED EMBODIMENT

Figure 1A:
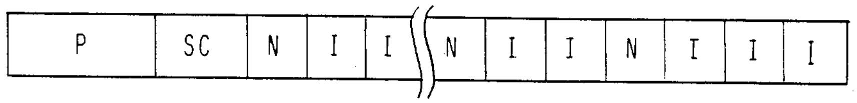
FIGS. 1A to 1C illustrate the paging signal formats for use in a paging system to which the paging receiver according to the present invention is applicable.
Figure 1B:
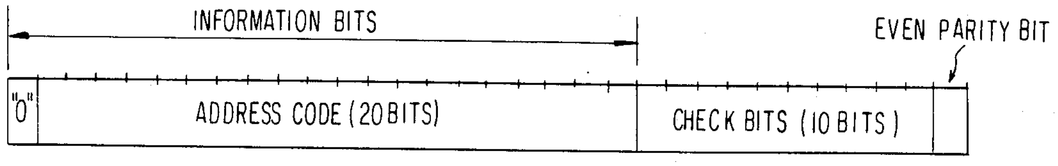
Figure 1C:
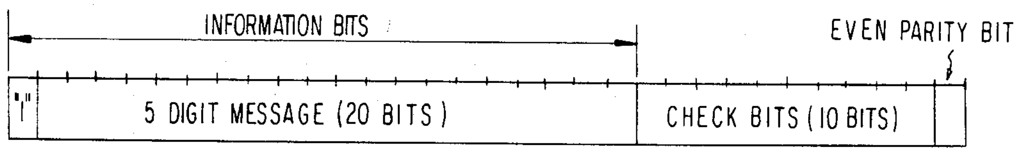

Referring to FIG. 1A, a paging signal includes a preamble code P, a frame synchronization code SC, a subscriber or address code N and a message or messages I. A plurality of messages I may be arranged if the message length so requires. FIGS. 1B and 1C respectively show an address code and a message, each using a codeword composed by adding one even parity bit to a (31, 21) Bose-Chaudhuri-Hocquenghem (BCH) block code. Thus, each of these codewords is composed of 32 bits, of which the first 21 are information bits, the next 10 are check bits and the final one is the even parity bit. Out of the information bits, the most significant bit (MSB) is used for discriminating whether a given code is an address code or a message, and the remaining 20 are used as the address code or message.

The message can not only indicate a number but also alphabetical information. In this embodiment, however, only the number message will be described for simplicity.

Up to five digits per word of message can be transmitted by the binary-code decimal (BCD) method (four bits). Thus, one digit can be indicated by four bits. If the transmission of 10 digits is desired, it can be achieved by transmitting two words. If more than 10 digits are to be sent out, they can be transmitted in three words, four words and so on, but to simplify the description, the message length here is supposed to be fixed at 10 digits (two words). It is further supposed that the sequence of the address code N and the message I consists of 20 words here.

Figure 2:
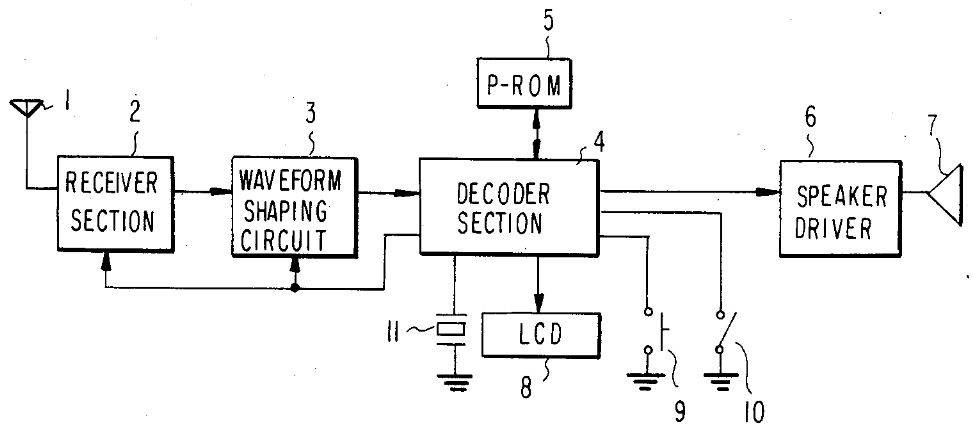
FIG. 2 is a block diagram illustrating a preferred embodiment of the paging receiver with display function according to the invention.

Referring now to FIG. 2, a radio carrier wave received by an antenna 1 is demodulated into a baseband signal after being amplified by a receiver section 2. The demodulated baseband signal is converted by a waveform shaping circuit 3 into a waveform readable by a decoder 4. The decoder 4, comparing the number indicated by the signal from the waveform shaping circuit 3 with its own subscriber number stored in advance in a programmable-read only memory (P-ROM) 5, supplies a tone signal to an amplifier 6 to alert the bearer of the receiver if the two signals are found identical, and drives a speaker 7. In the P-ROM 5 are written two kinds of subscriber or call numbers (referred to as A-call and B-call herein), so that the so-called dual call service can be achieved.

The decoder 4 further deciphers a message following the address code N, drives a liquid crystal display (LCD) to provide the bearer with visible information. A reset switch 9, connected to the decoder 4, performs such actions as stopping the alert tone and turning on or off the LCD 8. A mode selector switch 10 is for selecting either of the normal mode and the memory mode. A quartz oscillator 11 is provided for generating clocks to actuate the decoder 4.

In addition, the receiver has a battery saving function under which the decoder 4 controls the power supply to the receiver section 2 and the waveform shaping circuit 3. The description thereof will be omitted in this specification, because it is not directly related to the subject matter of this invention.

Figure 3A:
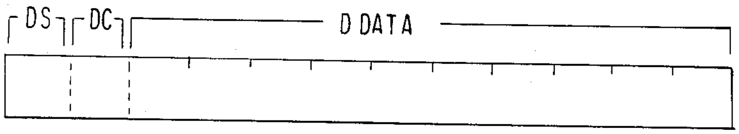
FIGS. 3A and 3B to 3E respectively illustrate an outline of and typical displays on the display unit of the receiver shown in FIG. 2.

With reference to FIG. 3A, the LCD 8 has 12 display digits. The most significant digit DS indicates the relative age of a received message, or the place of the displayed message among a plurality of stored messages, counted from the latest one ("1" for instance indicates that the received message is the newest). DS will also indicate an overflow (with "0" for example) if additional paging signals or additional calls are successively received before the alert tone of an earlier call has finished sounding and surpass the combined capacity of a plurality of memory units. DC, arranged next, is a digit to distinguish between A-call and B-call. For instance, "—" represents an A-call and "_", a B-call. In the DDATA area, where a 10-digit message is displayed, there also is given a "CALL" sign, which indicates the receipt of a call or calls while the memory mode is on, as will be described in further detail below.

Figure 3B:
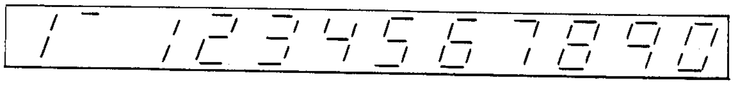
Figure 3C:
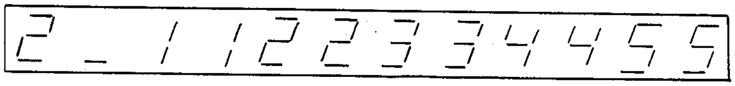
Figure 3D:
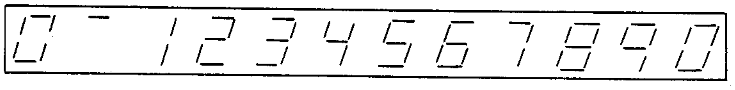
Figure 3E:
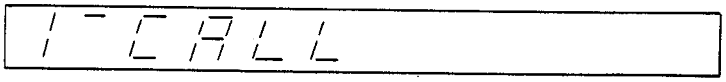
Figure 4:
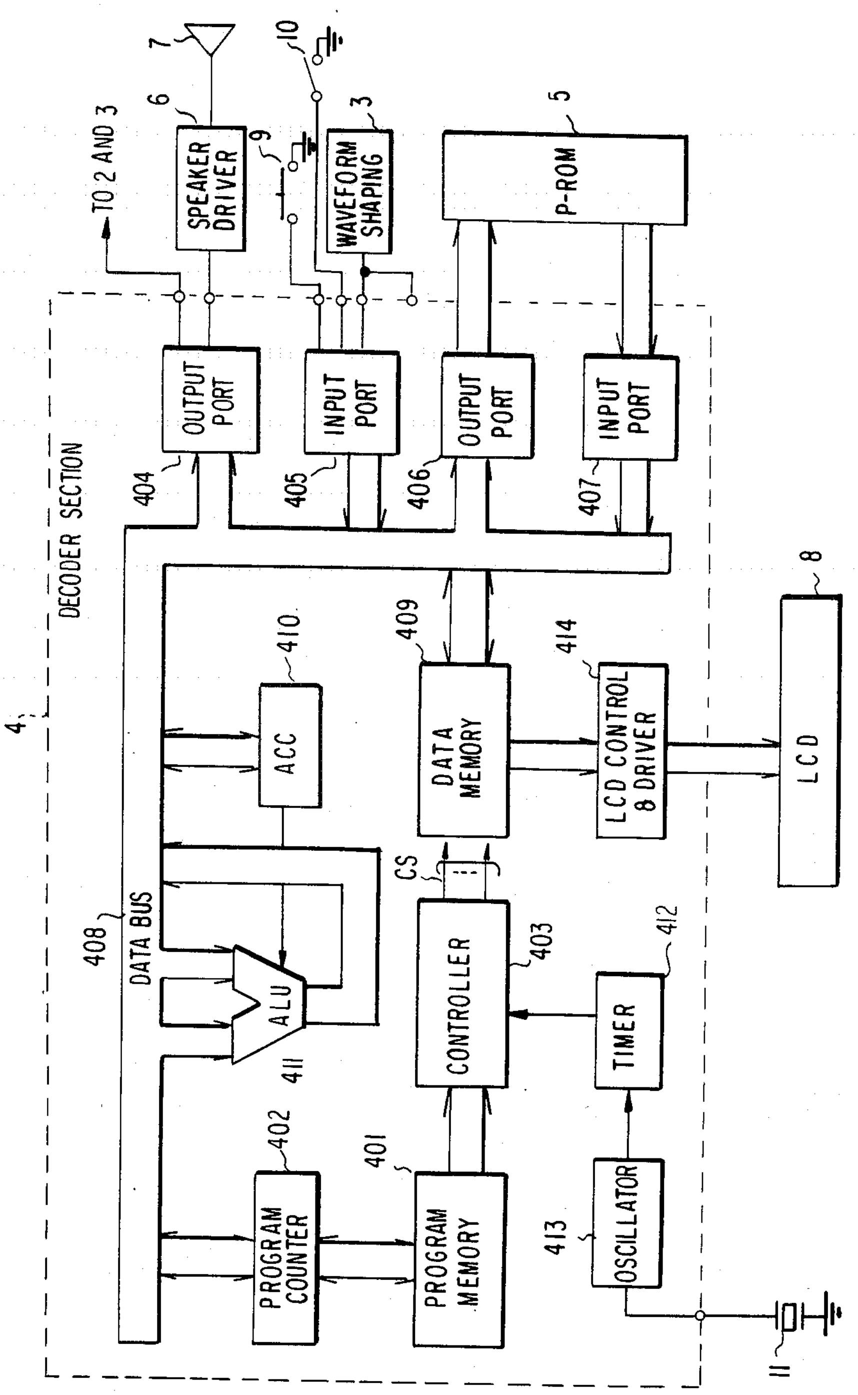
FIG. 4 is a more detailed block diagram of the decoder section of the receiver illustrated in FIG. 2.

Therefore, the display shown in FIG. 3B indicates an A-call with a message of 1234567890, which is the latest call. Similarly, FIG. 3C illustrates a B-call with a message of 1122334455, which is the second latest call. FIG. 3D shows an overflow resulting from the receipt of successive later calls while an alert tone for the call shown in FIG. 3B is still sounding. FIG. 3E indicates the receipt of an A-call while the memory mode is on.

Now, the operation of the decoder 4 will be described in greater detail with reference to FIGS. 4, 5, 6A, 6B, 7A and 7B.

The decoder 4 is a single-chip central processing unit, and such peripheral units as a read-only memory (ROM), a random-access memory (RAM) and input-/output (I/O) ports are also contained in the single chip. NEC Corporation's μPD7502, for instance, can be used for this purpose.

In a program memory 401 are written a sequence of commands for operation as a decoder. From the program memory 401 is supplied the content at an address corresponding to a program counter 402 to a controller 403, which sends out control signals CS to various sections according to the content. The program counter 402 usually adds +1 every time the content of the program memory 401 is supplied to the controller 403, but if there is a jumping command or the like, it will follow such a special command.

An interface between external circuits and a data bus 408 includes an output port 404, an input port 405, another output port 406 and another input port 407. The output port 404 is responsible for sending out tone signals and battery saving control signals; the input port 405, for writing in data from the waveform shaping circuit 3 and the states of the reset switch 9 and the mode selector switch 10; the output port 406, for sending out pulses to read data out of the P-ROM 5; and the input port 407, for writing data of the P-ROM 5 into the decoder.

Further, the data bus 408 is also connected to the program counter 402, a data memory 409, an accumulator 410 and an arithmetic and logic unit (ALU) 411 to transfer data.

Synchronization clocks, needed for writing in data from the waveform shaping circuit 3, are generated by the quartz oscillator 11, an oscillator 413 and a timer 412.

An LCD control/driver 414 is a control/driver circuit for displaying on the LCD 8 a specific one among the data stored in the data memory 409.

Figure 5:
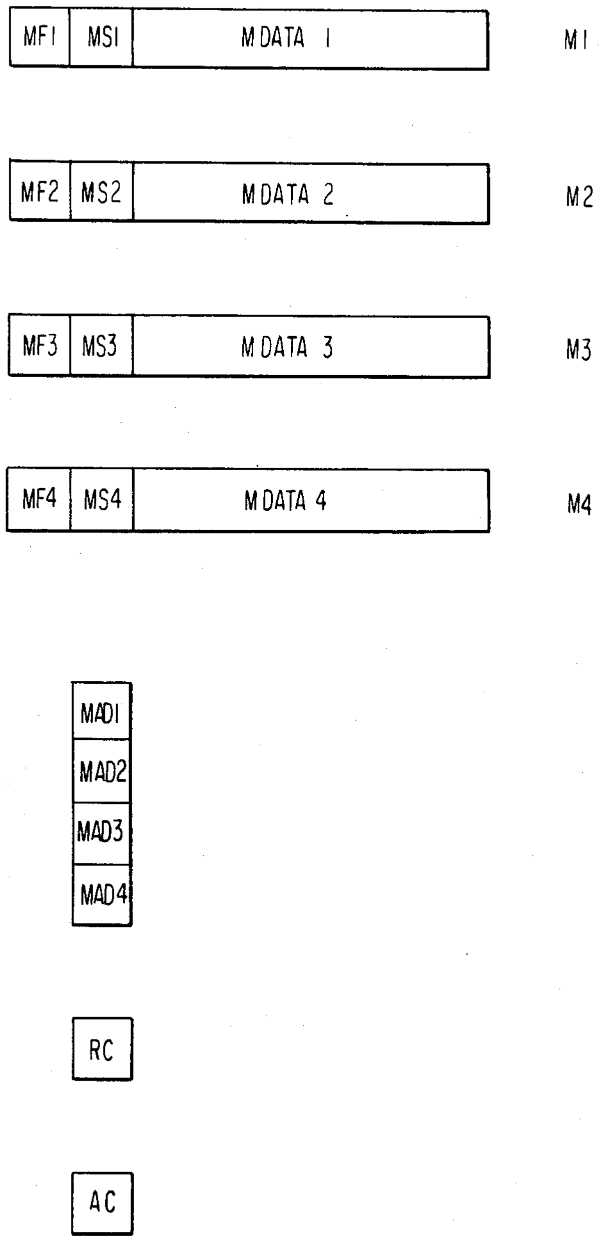
FIG. 5 is a conceptual drawing illustrating a part of the data memory in the decoder shown in FIG. 4.

With reference to FIG. 5, Mx may be any one of memories M1, M2, M3 and M4; MFx, any one of memories MF1, MF2, MF3 and MF4; MSx, any one of memories MS1, MS2, MS3 and MS4, and MDATAx, any one of memories MDATA1, MDATA2, MDATA3 and MDATA4.

MDATAx can store up to 10 digits or two-word message. MFx stores "0" in case where MDATAx stores no message and "1" in case where MDATAx stores a message. MSx stores "0" in case where the paging receiver is paged by the A-call and "1" in case where paged by the B-call.

MAD1 to MAD4 represent the addresses of M1 to M4, respectively, with MAD1 referring to the newest memory and MAD4, the oldest. When message information is received, the contents of MAD1 to MAD4 are shifted in the order of MAD1 to MAD2, to MAD3, to MAD4 and again to MAD1, so that already stored messages are made obsolete one by one as a new message is written into a memory designated by MAD1 and if the quantity of message information surpasses 10 digits×4, the overflow being discarded on a first-in first-out basis.

RC is the memory area for the count indicating how many times messages have been read out during a read-out operation by the reset switch, and AC, that of the count indicating how many times an alert situation has occurred during the reception of a call. The count memory areas RC and AC are identical with the figure indicating the relative age of a given message (the figure represented by DS, the most significant digit on the display).

The operation after the receipt of an address code will be described in detail hereunder with reference to the flow charts of FIGS. 6A, 6B, 7A and 7B.

Figure 6A:
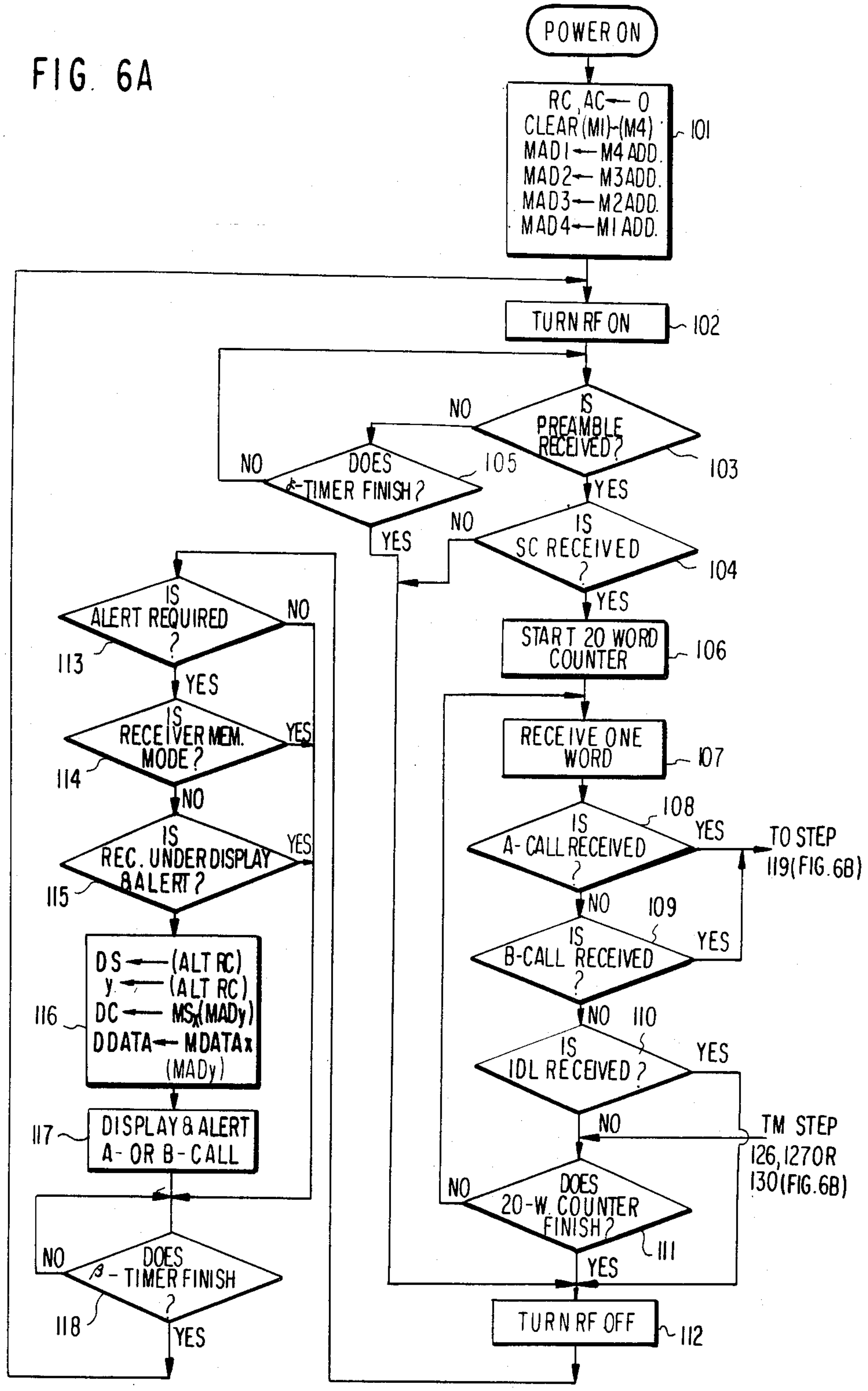
FIGS. 6A, 6B, 7A and 7B are flow charts showing the operation of the receiver illustrated in FIGS. 2 to 5.
Figure 6B:
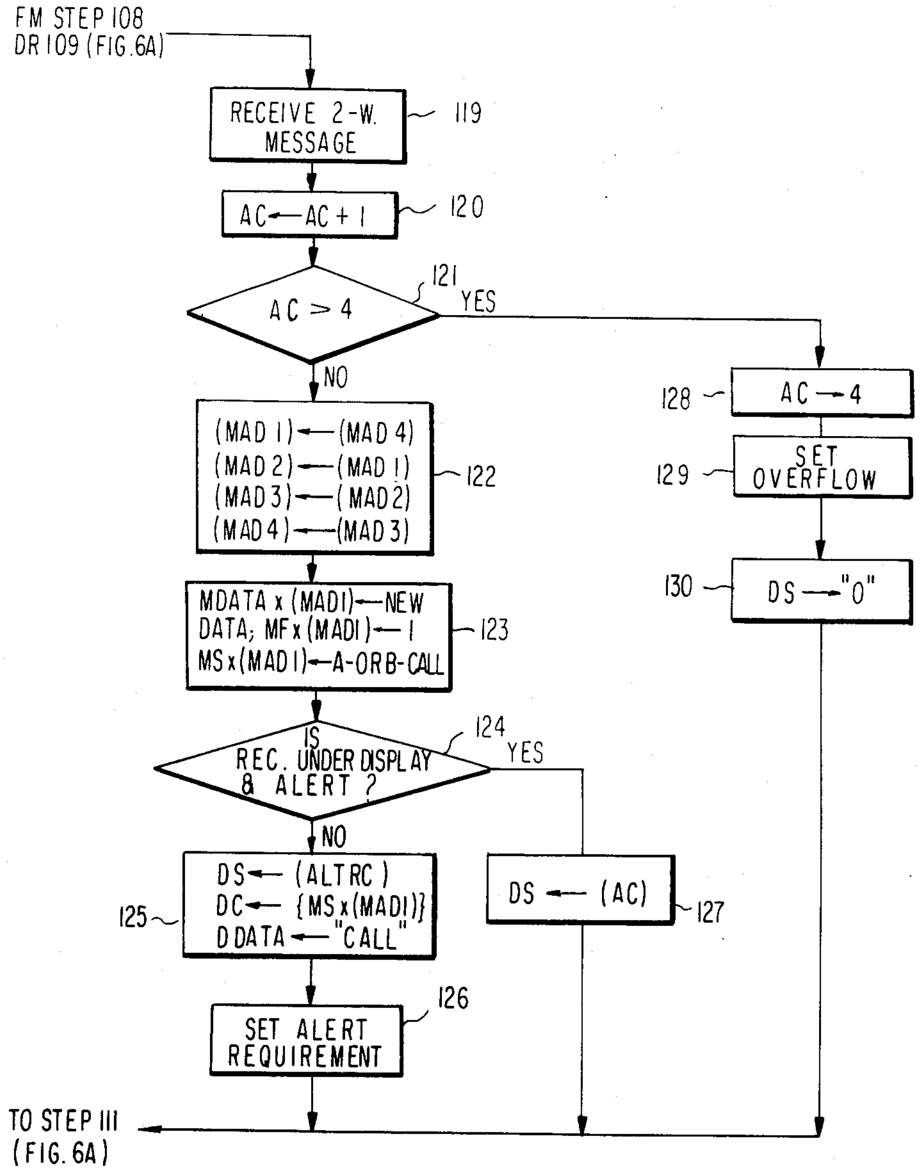

FIGS. 6A and 6B represent the flow from the receipt of an address code after the power supply is turned on until the sounding of an alert tone and the display of the message, with the message information being memorized.

First will be explained the operation during a usual waiting period in the normal mode. When the power supply is turned on, all of the memories RC, AC and M1 to M4 are cleared, followed by storing the address of the memory M4 in the address memory MAD1, that of M3 in MAD2, that of M2 in MAD3 and that of M1 in MAD4 (See Step 101).

At step 102, the power supply to the receiver section 2 and the waveform shaping circuit 3 (together referred to as the RF section) are turned on to enable them to receive a radio carrier wave. At step 103 to 105 and 112, if a preamble is detected before a timer $\alpha$ counting a prescribed length of time (70 ms, for example) completes its counting, the receiver moves on to receiving the next frame synchronization code SC. In other words, if no preamble code is detected before the timer $\alpha$ completes its counting, the power supply to the RF section is turned off again. If no SC is received at Step 104, the receiver will go on to Step 112. In other words, if an SC is received, it will move ahead to receiving a call number (See Step 106 and thereafter).

Now in receiving an address code, first a 20-word counter is started to receive one word at a time (See Step 106 and 107). If the data of the received word is found identical with that of either the A-call or the B-call written into the P-ROM 5 (Steps 108 and 109), the receiver will move on to receiving a two-word message (Step 119 in FIG. 6B), but if it is found identical with neither, it will be checked whether or not the received one-word data is an idle code IDL (Step 110). If it is found to be the idle code IDL, the RF section will be turned off at that point in time (Step 112), but if it is not, the call number receiving action will be repeated until the 20-word counter has finished counting. Whereas this idle code IDL is a kind of call number, the receiver is so built as to turn off its RF section upon receipt of this code with a view to strengthening the battery saving function.

If an A-call or a B-call is received at Steps 108 and 109, a two-word message will then be received (Step 119 in FIG. 6B), and a counter memory AC counted up by one (Step 120). The counter memory AC is at "0" when the power supply is on and can count up to 4 at Step 121. Since AC is at "0" in a normal waiting period, the shifts between MAD1, MAD2, MAD3 and MAD4 are written in at Step 122, and so are, at Step 123, a received data into the memory MDATAx designated by MAD1, "1" into the memory area MFx indicating that the data is stored, and whether the A-call or the B-call has been received into the memory area MSx indicating the type of call.

After that, it is checked whether or not the receiver has already received a call and an alert tone is being sounded with the message displayed at Step 124; if no alert tone is sounded and the display is actuated, the value of the memory AC will be displayed at DS, the most significant digit, the type of call (the value of MSx) at DC, the next digit, and "CALL" in DDATA, the message display area to set an alert demand flag (See Steps 125 and 126). Then, it is checked whether or not the 20-word counter has finished counting (Step 111 in FIG. 6A); if it has, the RF section will be turned off at Step 112 and, since the alert demand flag is set at Step 113, it is checked whether or not the receiver is in its memory mode at Step 114. If it is not in the memory mode, it will be checked whether or not the receiver still retains the alert tone and the display of the last message (Step 115), and if it does not, there will be started the display of the message of a new call and the sounding of an alert tone (Steps 116 and 117). Then, as a timer $\beta$ completes its counting of a prescribed length of time (920 ms, for instance) after the RF section was turned off, the receiver will return to a signal receiving operation (Step 118). That an alert tone is sounded only after the completion of the reception of 20 words instead of immediately upon receipt of a message is because the sounding of the alert tone may affect the power supply line to invite a drop in sensitivity.

Figure 7A:
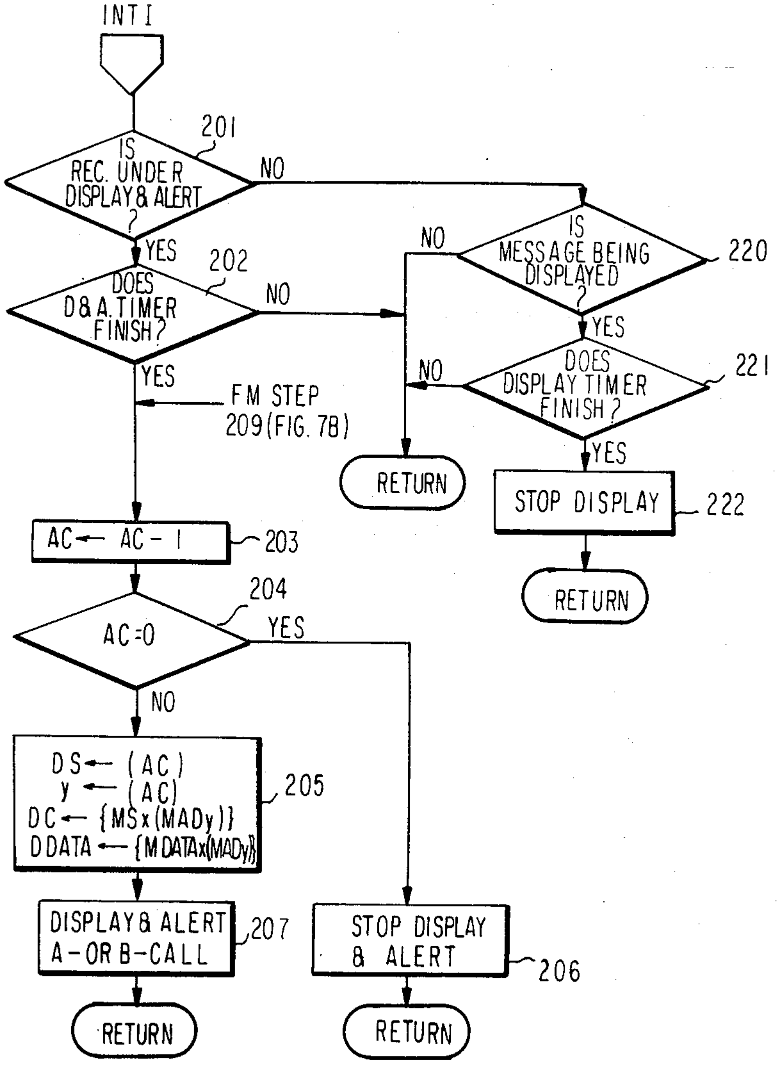
Figure 7B:
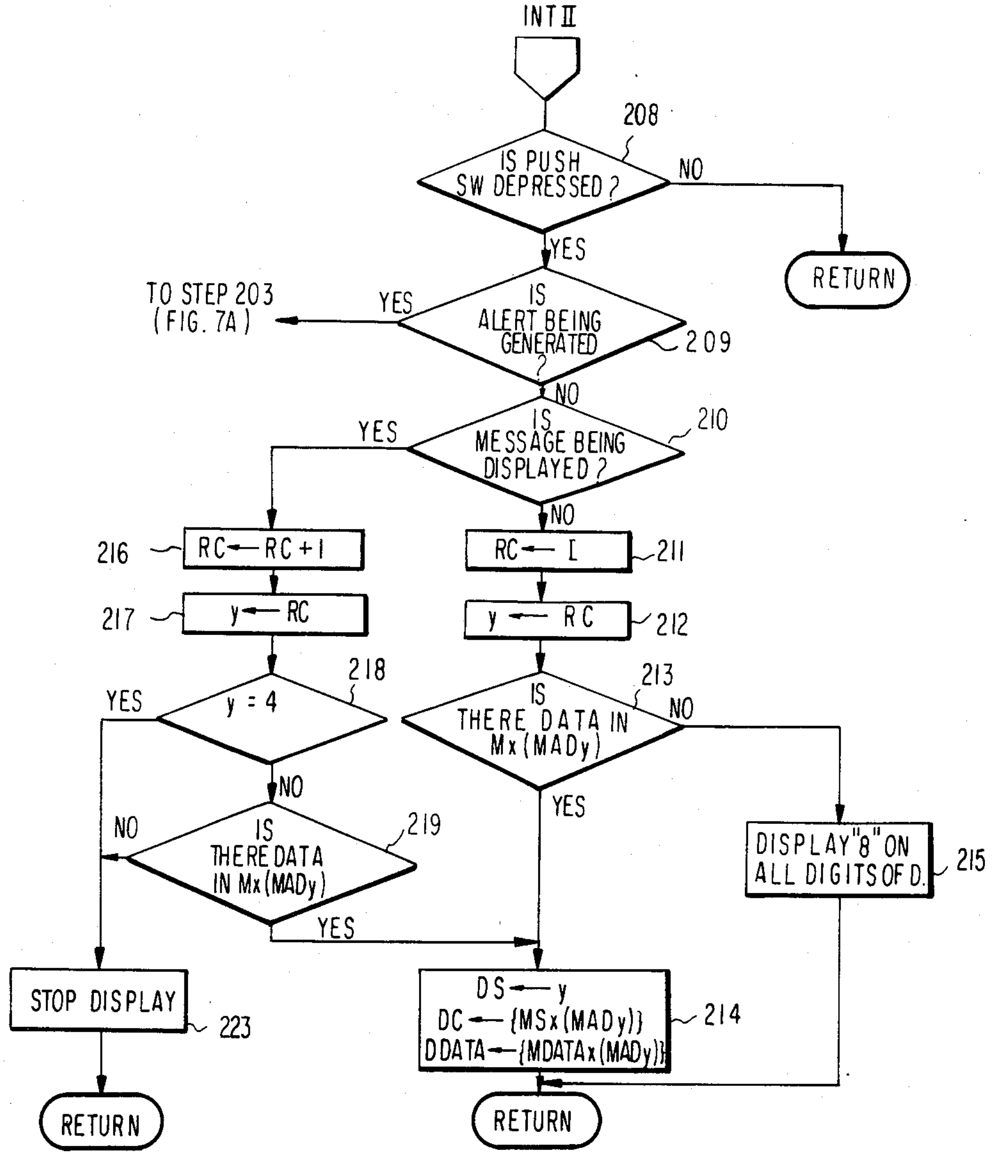

Now, it is so arranged in this receiver that interrupts I (INT I) of FIG. 7A and interrupts II (INT II) of FIG. 7B regularly (for instance at 5 ms intervals) occur alternately in the main flow of FIGS. 6A and 6B.

Referring to FIGS. 7A and 7B, after the sounding of the alert tone and display of the message are started, it is checked at an interrupt I whether or not an alert tone is sounding at Step 201, and then the alert tone timer (for 8 sec. for instance) is monitored at Step 202 until its completion, after which the receiver moves on to Step 203 and thereafter. At Step 203, the memory AC is counted down by 1, so that AC be 0 during reception in the normal waiting condition to discontinue the sounding and display (See Step 204).

During an interrupt II, the state of the reset switch is constantly monitored at Step 208. If the reset switch is pressed during the sounding of an alert tone and display of the message, the receiver will go on to Step 203 and the subsequent steps like after an interrupt I, so that the sounding and display can be cleared when the reset switch is pressed earlier than the action of the alert tone timer.

Referring back to FIG. 6B, now will be described the flow that will occur when a second call comes in while the message of a first call is still being displayed, with an alert tone sounding. If another A-call or B-call is received at Step 108 or 109 while an alert tone is still sounding, a two-word message will be received at Step 119 and the memory AC counted up by 1 at Step 120. This situation differs from the above-described waiting condition in that the memory AC already has a count of 1 or above during the sounding of an alert tone. A new call can be received until AC reaches "4" at Step 121. This is because there are four message memories, and therefore five or more messages cannot be stored at the same time. If the memory AC's count is 4 or below, there will again be the shifting between MAD1, MAD2, MAD3 and MAD4 by one message each to have the new message stored (See Step 122). At the same time, since an alert tone is sounding and a message displayed at Step 124, only the most significant digit DS of the LCD 8 will be changed to let the bearer of the receiver know the receipt of another call during the sounding of an alert tone and the display of an earlier message (Step 127). Thus, the DS reading of "1" for the first call will now be replaced by "2", indicating that the call being displayed already is the second latest call. After that, when either the alert tone timer completes its counting (Step 202 in FIG. 7A) or the reset switch is pressed (Step 208 in FIG. 7B), AC is counted down by 1 to start the display of a message and the sounding of an alert tone for the last received call (See Steps 203, 205 and 207).

If more A-calls and/or B-calls are successively received during the sounding of an alert tone and the display of an earlier message to cause the memory AC to surpass 4 (See Step 121), the memory AC's count will be left at "4" (Step 128), an overflow flag set (Step 129), and "0" shown at DS, the most significant digit of the LCD 8, to let the bearer know message memories have overflowed. Obviously, the message received then is discarded without being stored into the message memory.

Next will be described, with reference to FIG. 6A, the flow that takes place when the receiver receives a call when in its memory mode. In the memory mode, the part of the flow from the receipt of a call until the display of "CALL", referred to in FIG. 3E, is the same as in the above-mentioned normal mode. However, after the RF section is turned off at Step 112, it is checked whether or not the receiver is in its memory mode at Step 114, and then the display of "CALL" is retained without sounding an alert tone to let the bearer know the receipt of a new call only by the indication on the LCD. Moreover, the indication of "CALL" instead of displaying message information makes it possible to keep the content of the message secret from third parties (in the event, for instance, the receiver is on the desk during a meeting). Furthermore, even if a plurality of new calls are received in the memory mode, the most significant digit DS of the LCD will be renewed until the number of such new calls reaches four (Step 127 in FIG. 6B), and if five or more new calls are received to overflow the memories, DS will be be reduced to "0", so that the bearer will know how many calls have been received in the memory mode, and the possibility of calls being discarded in the ignorance of the bearer can be substantially reduced thereby.

Although no description has been specifically made of the flow in which the calling can be actuated upon switching from the memory to the normal mode if there was any call received during the memory mode, an arrangement can be so made as to let the receiver go to Step 204 of FIG. 7A when it has noticed the switching of the decoder 4 from the memory to the normal mode.

For supplementary reference, the method to read out again the stored message will be described below with reference to FIG. 7B. Whereas it was already stated that the reset switch was monitored during the interrupt II (FIG. 7B), pressing the reset switch when neither an alert tone is sounded nor a message is displayed starts a reading action (Step 210 and thereafter in FIG. 7B). Then, it being checked whether or not a message is already displayed at Step 210, if the reset switch is pressed when nothing is displayed, a memory RC for the reset switch is set at "1" at Step 211, and this value of the RC (1 in this particular instance) is stored into a y register to check whether or not a memory designated by MADy (MAD1 here) has any data (Steps 212 and 213). If no data is found at Step 213, "8" will be displayed on all the digits of LCD at Step 215, indicating that the receiver has received no call as yet or, if any data is found, that data will be displayed at Step 214. If this indication is left as it is, since the display timer was checked at Step 221 in the interrupt I of FIG. 7A after checking whether or not a message was displayed at Step 220, the indication will be maintained until the display timer completes its counting and, upon its completion, will be turned off at Step 222.

If the reset switch is pressed again while a message is being displayed, the receiver will go to Step 216 and the subsequent steps in the interrupt II of FIG. 7B, count up the content of the memory RC by 1 (Step 216), register this value of the RC into the y register at Step 217 and, if the value of y is 4 or below, check whether or not any data is in a memory designated by MADy (See Steps 218 and 219). If any data is found in the memory, the data of said memory will be displayed at Step 214 or, if not, the display will be turned off at Step 223. If the value of y surpasses 4, the display will be compulsorily turned off at Step 223 because four messages have already been read out. By successively pressing the reset switch, a plurality of messages can thus be read out.

Although, in this embodiment, when a greater number of calls than the number of memory means have simultaneously come in during the display of a message, an overflow is displayed and new message is discarded, also acceptable instead is a method by which the displayed message is discarded and the new messages are stored.

As hitherto described, according to the present invention, even if a second message is received while a first message is being displayed, the displayed content is not immediately altered, and instead only the fact of the receipt of that second call is made known to the user of the receiver. Accordingly, there is provided a more reliable and convenient radio paging receiver having display function, with which the user can definitely confirm the displayed message information and, at the same time, be urged to confirm the next call as well.

What is claimed is:

1. A radio paging receiver for receiving a carrier wave modulated with a paging signal comprising a preamble code, and address code and a message, said receiver comprising:

memory means for storing a prescribed number of received messages;

display means having a plurality of first display digits and one second display digit;

first counter means (AC) for counting the number of messages which are received during the display of an earlier received message on said first display digits;

second counter means (RC) for counting the number of messages which have been read out in response to switching signals produced by actuation of a manually operable switch (9), said second counter means registering a count of one on the first actuation of said switch when no message is displayed on said first display digits and thereafter being incremented on successive actuations of said switch; and control section means for reading in response to any one of said switching signals a message out of said memory means and the contents of said second counter means and displaying the read-out message and the contents of said second counter means on said first and second display digits, respectively, counting up the contents of said second counter means every time a received message is read out and displayed, said control section means further including means responsive to said receiver receiving and storing a new message during the display of an earlier received message on said first display digits, for keeping the display of said earlier message as it is while altering the display of said second display digit to indicate that a new message has been received and stored and thereafter causing display of said new message in response to comoletion of the display of said earlier received message while causing the decrementing of the contents of said counter means each time a new message is displayed.

2. A radio paging receiver, as claimed in claim 1, wherdin said control section means further includes means, responsive to said receiver receiving any additional message causing said prescribed number to be reached and thereby bring said memory means to a filled-up state while there is being displayed a received message on said display, for displaying an indication of that fact on said second display digit.

3. A radio paging receiver, as claimed in claim 1, further comprising notifiying means for sounding an alert tone in response to the detection of said address code and means for muting said notifying means to put said receiver into a memory mode.

4. A radio paging receiver, as claimed in claim 3, wherein said control section means includes means, responsive to said receiver detecting said paging signal while in said memory mode, for displaying an indication of said detection and the contents of said counter means on said first and second display digits, respectively.

5. A radio paging receiver, as claimed in claim 4, wherein said control section means further includes means, responsive to receipt of an additional message causing said prescribed number to be reached bringing said memory means to a filled-up state while said receiver is displaying an indication of said detection and the contents of said counter means on said first and second display digits, respectively, for displaying an indication that such filled-up state has been reached.

6. A radio paging receiver, as claimed in claim 4, wherein said means for displaying an indication of said detection includes means for displaying the word "CALL" on said display means.

7. A radio paging receiver, as claimed in claim 1, wherein said control section means includes a microprocessor programmed

- to detect said address code;
- to write said message into said memory means;
- to display said received message on said first display digits;
- to display, in resonse to said switching signal, a message stored in said memory means on said first display digits;
- to display the contents of said second counter means on said second display digit;
- to increase the count of said second counter means every time one of said stored messages is read out;
- when said receiver receives and stores a new message while a previously received message is being displayed, to leave the display of said received message as it is and to display on said second display digit an indication of said new message having been received and stored;
- to display said new message in response to completion of the display of said previously received message, and to reduce the count of said first counter means each time a new message is displayed.

8. A method for displaying a received message on a display means of a receiver, said display means having a plurality of first display digits and one second display digit, said method comprising the steps of:

- storing said messdge in the memory means of said receiver;
- displaying the stored message on said first display digits and storing the receiving order of said messages; displaying said receiving order on said second display digit;
- storing the number of new messages which are received during the display of an earlier received message;
- displaying on said second digit, when said receiver receives a new message during the display of an earlier received message, an indication of said new message having been received according to a change in said receiving order without altering the display of said earlier message; and
- displaying said new message on said first display digit in response to completion of the display of said earlier received message.

9. A method, as claimed in claim 8, further including the step of, when said receiver, during the display of said earlier message, receives a new message causing said memory means to reach to a filled-up state, displaying an indication of such state on said display means.

10. A method, as claimed in claim 8, further including the steps of:

- sounding an alert tone upon receipt of an address code sent from said transmitting side together with one of said messages;
- placing said receiver in a memory mode by prohibiting the sounding of said alert tone in response to a control signal; and
- upon receipt of one of said messages in said memory mode, displaying an indication of such receipt on said first and second display digits.

11. A method, as claimed in claim 10, further including the steps of:

- storing said receiving order of messages; and
- displaying said receiving order, together with the fact of said receipt of message in said memory mode, on said display means.

12. A method, as claimed in claim 11, further including the step of displaying when said receiver in said memory mode receives a new message which makes said memory means overflow, an indication of such overflow on said second display digit.

* * * * *

UNITED STATES PATENT AND TRADEMARK OFFICE
CERTIFICATE OF CORRECTION

PATENT NO. : 4,682,148

DATED : July 21, 1987

INVENTOR(S) : ICHIKAWA ET AL

It is certified that error appears in the above-identified patent and that said Letters Patent is hereby corrected as shown below:

| | |
|---|---|
| COLUMN 8, LINE 62 | After "response to" delete "comoletion" insert --completion -- |
| COLUMN 8, LINE 65 | After "said" insert --first-- |
| COLUMN 8, LINE 68 | Delete "wherdin" insert --wherein-- |
| COLUMN 10, LINE 7 | Delete "messdge" insert --message-- |
| COLUMN 10, LINE 16 | After "on said second" insert --display-- |
| COLUMN 10, LINE 48 | After "of displaying" insert --,-- |

Signed and Sealed this

Second Day of August, 1988

*Attest:*

DONALD J. QUIGG

*Attesting Officer*

*Commissioner of Patents and Trademarks*